United States Patent
Dreher et al.

(10) Patent No.: US 10,723,983 B2
(45) Date of Patent: Jul. 28, 2020

(54) POUCHES COMPRISING APERTURED FILM WALL MATERIALS AND METHODS FOR MAKING SAME

(71) Applicant: The Procter & Gamble Company, Cincinnati, OH (US)

(72) Inventors: Andreas Josef Dreher, Cincinnati, OH (US); Mark Robert Sivik, Mason, OH (US); Gregory Charles Gordon, Loveland, OH (US); Hailing Bao, Blue Ash, OH (US); Paul Dennis Trokhan, Hamilton, OH (US); Paul Thomas Weisman, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 82 days.

(21) Appl. No.: 14/476,831

(22) Filed: Sep. 4, 2014

(65) Prior Publication Data
US 2015/0072915 A1   Mar. 12, 2015

Related U.S. Application Data

(60) Provisional application No. 61/874,546, filed on Sep. 6, 2013.

(51) Int. Cl.
| | | |
|---|---|---|
| *C11D 17/04* | (2006.01) | |
| *B65D 65/46* | (2006.01) | |
| *B32B 38/04* | (2006.01) | |
| *B32B 37/00* | (2006.01) | |

(52) U.S. Cl.
CPC ........ *C11D 17/042* (2013.01); *B32B 37/0076* (2013.01); *B32B 38/04* (2013.01); *C11D 17/041* (2013.01); *B32B 2038/047* (2013.01); *Y10T 156/1056* (2015.01)

(58) Field of Classification Search
None
See application file for complete search history.

(56) References Cited

U.S. PATENT DOCUMENTS 3,066,347 A * 12/1962 Vosbikian ............... A47L 13/17
                                                                15/223
3,097,787 A *  7/1963 Milton .................... B65D 29/04
                                                                383/103
3,823,816 A *  7/1974 Controulis ........... A61K 9/4808
                                                                206/0.5

(Continued)

FOREIGN PATENT DOCUMENTS

DE    20 2008 007644 U1    10/2008
EP         1 543 763 A1      6/2005

(Continued)

OTHER PUBLICATIONS

PCT International Search Report dated Nov. 13, 2014—5 pages.

(Continued)

*Primary Examiner* — Lorna M Douyon
(74) *Attorney, Agent, or Firm* — C. Brant Cook (57) ABSTRACT

Pouches, for example pouches that contain one or more active agents, such as a fabric care active agent or dishwashing active agent and/or detergent compositions, and more particularly pouches employing an apertured film wall material and methods for making same, are provided.

19 Claims, 5 Drawing Sheets

(56) References Cited

U.S. PATENT DOCUMENTS

| | | | | |
|---|---|---|---|---|
| 4,155,971 | A | * | 5/1979 | Wysong .................. C08L 29/04 264/204 |
| 4,776,455 | A | | 10/1988 | Anderson et al. |
| 4,820,435 | A | | 4/1989 | Zafiroglu |
| 4,839,076 | A | | 6/1989 | Willman et al. |
| 5,053,270 | A | | 10/1991 | Mack |
| 5,160,654 | A | * | 11/1992 | Falou .................... C11D 3/3927 252/186.25 |
| 5,534,178 | A | | 7/1996 | Bailly et al. |
| 6,486,095 | B1 | * | 11/2002 | Fujita .................... A01N 25/14 504/367 |
| 8,250,837 | B2 | | 8/2012 | Tanguy et al. |
| 8,551,929 | B2 | | 10/2013 | Graham et al. |
| 2002/0025215 | A1 | * | 2/2002 | Duden ................... A45D 44/00 401/201 |
| 2002/0077264 | A1 | | 6/2002 | Roberts et al. |
| 2006/0213801 | A1 | * | 9/2006 | Karaoren .............. C11D 17/042 206/524.7 |
| 2008/0177241 | A1 | | 7/2008 | Hasse et al. |
| 2008/0242572 | A1 | * | 10/2008 | Icht ....................... C11D 17/043 510/120 |
| 2010/0018641 | A1 | | 1/2010 | Branham et al. |
| 2011/0207646 | A1 | * | 8/2011 | Baez Chavez ......... C11D 3/386 510/221 |
| 2012/0053106 | A1 | | 3/2012 | Labeque |
| 2012/0053107 | A1 | | 3/2012 | Labeque et al. |
| 2013/0053293 | A1 | * | 2/2013 | Dituro .................. B65D 65/466 510/277 |
| 2013/0256182 | A1 | | 10/2013 | Petrovicova et al. |
| 2014/0228194 | A1 | * | 8/2014 | Kepinski ................ B65B 47/10 493/227 |
| 2014/0336029 | A1 | * | 11/2014 | Mirle ..................... B65D 31/12 493/267 |

FOREIGN PATENT DOCUMENTS

| | | | |
|---|---|---|---|
| EP | 2088187 | A1 * | 8/2009 |
| GB | 2 254 857 | A | 10/1992 |
| GB | 2375515 | A * | 11/2002 |

OTHER PUBLICATIONS

All Office Actions in U.S. Appl. Nos. 14/476,823 and U.S. Appl. No. 14/476,831, (date unknown).

U.S. Appl. No. 14/476,823, filed Sep. 4, 2014, Dreher, et al.

* cited by examiner

POUCHES COMPRISING APERTURED FILM WALL MATERIALS AND METHODS FOR MAKING SAME

FIELD OF THE INVENTION

The present invention relates to pouches, for example pouches that contain one or more active agents, such as a fabric care active agent and/or dishwashing active agent and/or detergent compositions, and more particularly to pouches comprising an apertured film wall material and methods for making same.

BACKGROUND OF THE INVENTION

Pouches comprising detergent compositions and/or liquid compositions have been made in the past with film wall materials. Some of these pouches have been made in the past with a single hole in the film wall material as a processing aid to degas the contents of the internal volume of the pouch. Such a single hole in the film wall material has shown no significant impact on the solubility of the film wall material during use. Other pouches known in the art do not contain such a hole in their film wall materials. Regardless, consumers are constantly looking for better performing pouches for use in their consumer cleaning operations, such as laundering and/or dishwashing operations. Better performing pouches means shorter Rupture Times, shorter Dissolution Times, and/or complete dissolution.

One problem with known pouches is their relatively long Average Rupture Time and/or average Dissolution Times and/or their less than complete dissolution of their film wall materials, which results in the film wall material remaining after use. The remaining film wall material can attach to whatever articles are being cleaned making use of the pouches an unpleasant experience for consumers. Also, a pouch's less than completely soluble film wall material presents a disposal problem or task after its use as it needs to be discarded in a solid waste stream.

Accordingly, there exists a need for a pouch comprising a film wall material that performs better than known pouches, for example by exhibiting a shorter Average Rupture Time, a shorter average Dissolution Time, and/or complete dissolution and methods for making same. Further, there exists a need for a pouch made from an apertured film wall material and methods for making same wherein the pouch exhibits a rapid release of its contents under conditions of intended use. Further yet, there exists a need for a pouch made from an apertured film wall material and methods for making the same that does not compromise the containment of materials and particulate matter within the pouch during distribution and handling. There also exists a need for a pouch made from an apertured film wall material and methods for making same where there is containment of materials and particulate matter in the pouch during distribution and handling while maintaining a sufficient amount of Geometric Mean (GM) Tensile Strength of the pouch's apertured film wall material. Further, there exists a need for a pouch comprising an apertured film wall material that comprises apertures that are selected to effectively maintain containment of particulates (active agents) within the pouch's internal volume. Lastly, there is a need for a pouch made from an apertured film wall material and methods for making same that provides for release of fragrances and scents during storage and use of the pouches.

SUMMARY OF THE INVENTION

The present invention fulfills the needs described above by providing novel pouches that comprise an apertured film wall material and methods for making same.

One solution to the problem described above is a pouch comprising an apertured film wall material, such as a water-soluble apertured film wall material that exhibits a shorter Rupture Time as measured according to the Rupture Test Method described herein, and/or shorter Dissolution Time as measured according to the Dissolution Test Method described herein, and/or complete dissolution.

In one example of the present invention, a unit dose product, such as a pouch, comprising an apertured film wall material, such as a water-soluble apertured film wall material, is provided.

In another example of the present invention, a pouch comprising a pouch wall that defines an internal volume of the pouch containing one or more active agents, wherein the pouch wall comprises an apertured film wall material, such as a water-soluble apertured film wall material, and wherein the pouch ruptures when exposed to conditions of intended use, such as during use, to release one or more of its active agents, is provided.

In another example of the present invention, a pouch comprising a pouch wall that defines an internal volume of the pouch containing one or more active agents, wherein the pouch wall comprises an apertured film wall material, such as a water-soluble apertured film wall material, that ruptures as measured according to the Rupture Test Method described herein is provided.

In even another example of the present invention, a pouch comprising an apertured film wall material, such as a water soluble apertured film wall material, that defines an internal volume of the pouch containing one or more active agents, wherein the pouch exhibits a % Weight Loss of less than 10% as measured according to the Shake Test Method described herein is provided.

In even yet another example of the present invention, a pouch comprising an apertured film wall material, such as a water-soluble apertured film wall material, that defines an internal volume of the pouch containing one or more perfume agents that are released from the pouch is provided.

In even yet another example of the present invention, a method for making a pouch according to the present invention comprising the steps of:
  a. providing an apertured film wall material, such as a water-soluble apertured film wall material; and
  b. forming a pouch defining an internal volume from the apertured film wall material, is provided.

In still yet another example of the present invention, a method for making a pouch according to the present invention comprising the steps of:
  a. providing a film wall material, such as a water-soluble film wall material;
  b. creating a plurality of holes in the film wall material to form an apertured film wall material; and
  c. forming a pouch defining an internal volume from the apertured film wall material, is provided.

In even still another example of the present invention, a method for treating a fabric article in need of treatment, the method comprising the step of treating the fabric article with a pouch according to the present invention, for example contacting the fabric article with a wash liquor formed by adding a pouch to water, is provided.

In even still another example of the present invention, a method for treating a dish in need of treatment, the method comprising the step of treating the dish with a pouch according to the present invention, for example contacting the dish with a wash liquor formed by adding a pouch to water, is provided.

In even still another example of the present invention, a method for treating a toilet bowl in need of treatment, the method comprising the step of treating the toilet bowl with a pouch according to the present invention, for example contacting the toilet bowl with a cleaning liquor formed by adding a pouch to water, is provided.

The present invention provides a pouch comprising an apertured film wall material, such as a water-soluble apertured film wall material, and methods for making same.

DETAILED DESCRIPTION OF THE INVENTION

Definitions

"Film wall material" as used herein means a film material that forms one or more of the walls of a pouch. In one example, the film wall material of a pouch, at least partially or entirely, defines, directly or indirectly, and encloses, directly or indirectly, an internal volume of the pouch.

Figure 1:
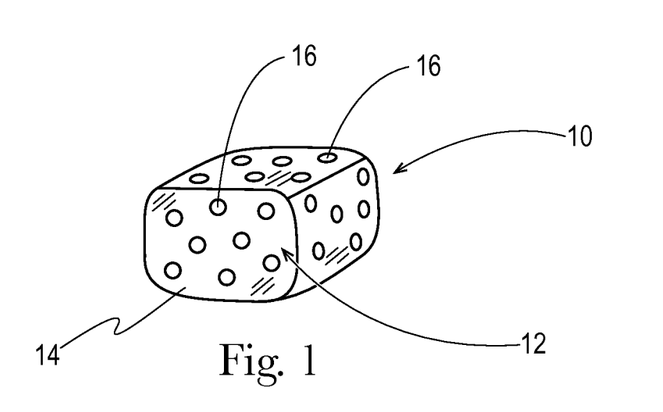
FIG. 1 is a schematic representation of an example of a pouch according to the present invention.
Figure 2:
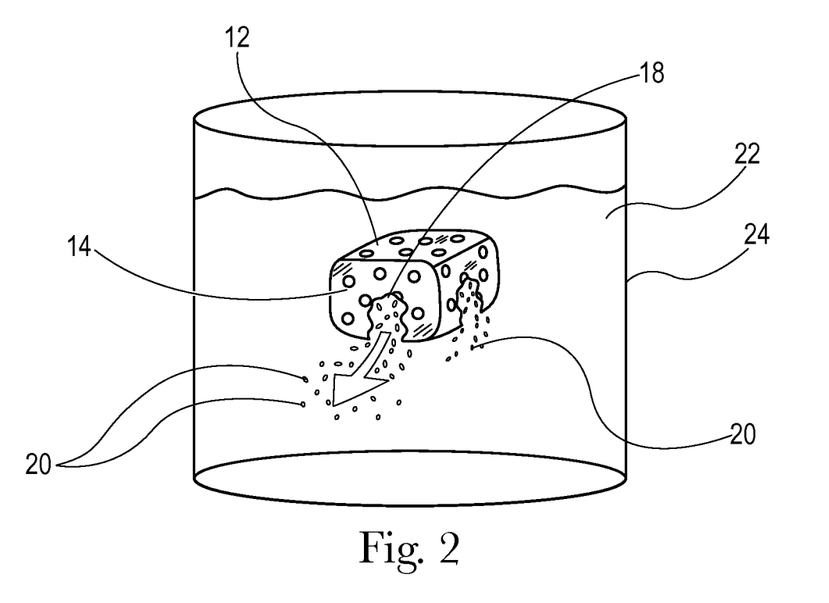
FIG. 2 is a schematic representation of the pouch of FIG. 1 during use.
Figure 3:
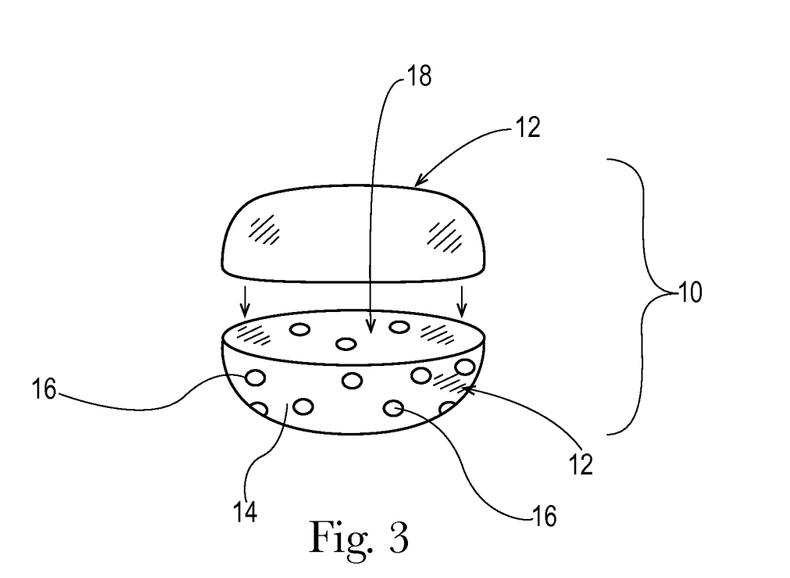
FIG. 3 is a schematic representation of another example of a pouch according to the present invention.
Figure 4:
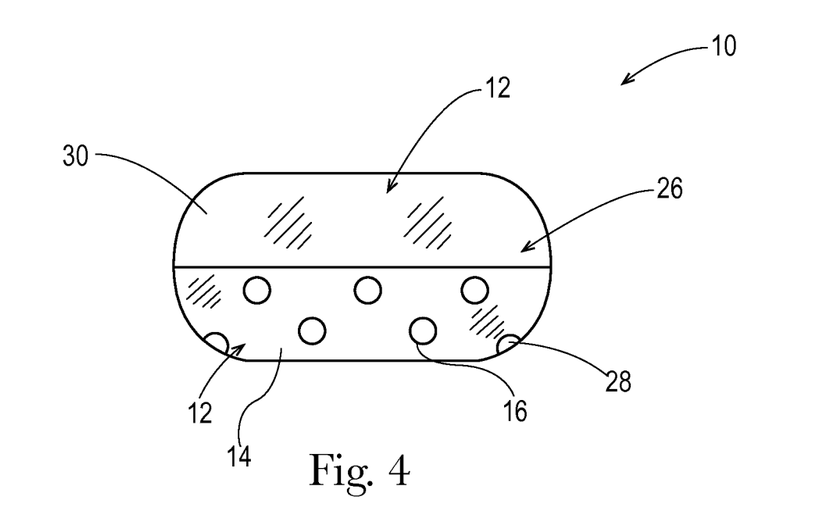
FIG. 4 is a schematic representation of an example of a multi-compartment pouch according to the present invention.

"Apertured film wall material" as used herein means that the film wall material comprises a plurality of holes, for example more than 2 and/or more than 3 and/or more than 4 and/or more than 5. In one example, the apertured film wall material makes up greater than 20% and/or greater than 50% and/or greater than 70% and/or greater than 90% and/or 100% of the total surface area of the film wall material. A pouch 10 having 100% of its total surface area being a film wall material 12; namely, an apertured film wall material 14 comprising a plurality of holes 16 is illustrated in FIGS. 1 and 2. In another example, the apertured film wall material 14 makes up less than 100% and/or less than 70% and/or less than 50% and/or less than 20% and/or less than 10% of the total surface area of the film wall material 12 of a pouch 10 as shown in FIG. 3. In still another example, as shown in FIG. 4, the pouch 10 is a multi-compartment pouch that comprises an apertured film wall material 14.

The apertured film wall material of the present invention may be homogeneous or may be layered. If layered, the apertured film wall material may comprise at least two and/or at least three and/or at least four and/or at least five layers.

The apertured film wall material making up the pouch may comprise one or more active agents, for example a fabric care active agent, a dishwashing active agent, a hard surface active agent, and mixtures thereof. In one example, an apertured film wall material of the present invention comprises one or more surfactants, one or more enzymes (such as in the form of an enzyme prill), one or more perfumes and/or one or more suds suppressors. In another example, an apertured film wall material of the present invention comprises a builder and/or a chelating agent. In another example, an apertured film wall material of the present invention comprises a bleaching agent (such as an encapsulated bleaching agent).

In one example, the apertured film wall material is a water-soluble apertured film wall material. In another example, the apertures of the apertured film wall material may be arranged in a regular pattern, for example in the form of a logo, word, and/or symbol, or a non-random, repeating pattern. In still another example, the apertures may be arranged in a non-repeating pattern.

Apertures within the apertured film wall material may be of virtually any shape and size, as long as the apertured film wall material provides the function of defining at least a portion of a pouch's internal volume. In one example, the apertures within the apertured film wall materials are generally round or oblong shaped, in a regular pattern of spaced apart openings. The apertures can each independently have a diameter of from about 0.1 to about 2 mm and/or from about 0.5 to about 1 mm. The apertures may form an open area within an apertured film wall material of from about 0.5% to about 25% and/or from about 1% to about 20% and/or from about 2% to about 10%. It is believed that the benefits of the present invention can be realized with non-repeating and/or non-regular patterns of apertures having various shapes and sizes. In one example, the apertures may be oriented such that an aperture's walls protrude outward from the pouch's apertured film wall material or inward toward the pouch's internal volume.

In one example, two or more of the apertures in the apertured film wall material have different sizes and/or shapes.

Figure 5:
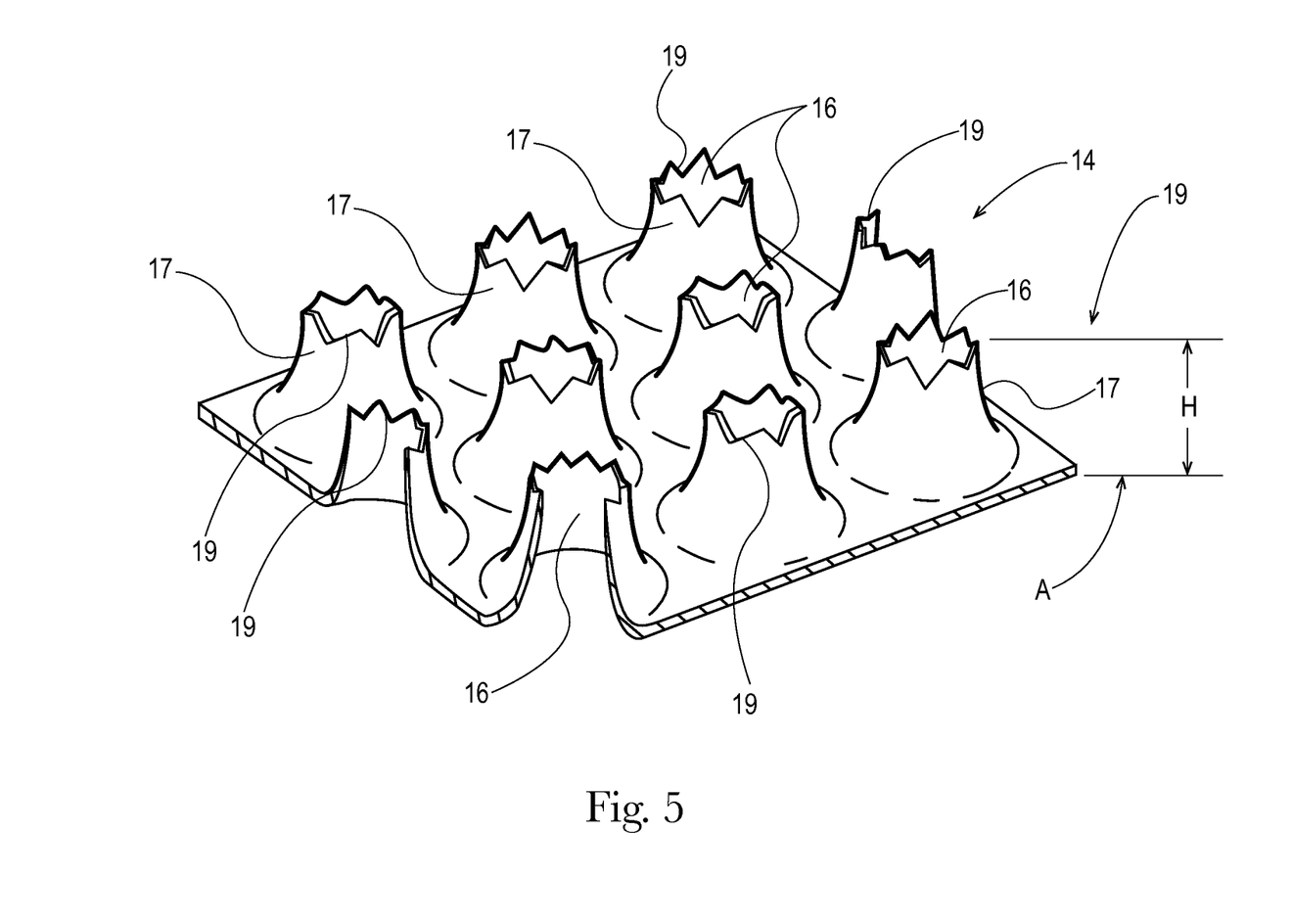
FIG. 5 is a schematic representation of an example of an apertured film wall material according to the present invention.

FIG. 5 illustrates an example of an apertured film wall material 14. The apertured film wall material 14 comprises a plurality of holes 16 defined in this case by aperture walls 17 that protrude from one surface of the apertured film wall material 14. In one example, the aperture walls 17 may protrude from both surfaces (opposing surfaces) of the apertured film wall material 14. As shown, the aperture walls 17 may be volcano-shaped structures having relatively thin, irregularly shaped distal ends 19 about their periphery. The aperture walls 17 extend from their distal ends to a surface of the apertured film wall material 14. The aperture walls 17 of the apertured film wall material 14 provide for increased softness impression to the skin of a user and keeps pouches made with this type of the apertured film wall material 14 from sticking to each other during storage and distribution in a package comprising a plurality of pouches. Pouches could be made with the distal end 19 of the apertured film wall material 14 directed inside or outside the pouch.

The aperture walls 17 of the apertured film wall material 14 shown in FIG. 5 may exhibit an Aperture Caliper H, which is the dimension from opposing surface plane A of the apertured film wall material 14 to a distal end 19 of an aperture wall 17.

The Aperture Caliper H is measured using microscopy techniques such as viewing a cross section of the apertured film wall material with a scanning electron microscope. The Aperture Caliper H is measured under a no confining weight condition with such microscopy methods. The diameter of the holes formed by the aperture wall extending from the apertured film wall material surface is the mean diameter measured by taking measurements from the opposing surface plane A of the aperture wall to the opening in the aperture wall at the aperture wall's distal end. Such diameter measurements are also made using microscopy as mentioned above for Aperture Caliper H measurements. Aperture Caliper H may exhibit values of from about 0 to about 3 mm and/or from about 0.01 mm to about 2 mm and/or from about 0.05 mm to about 2 mm.

In one example, openings/holes (apertures) may be punched into film wall materials, prior to and/or after being formed into a pouch, using any suitable process and/or equipment, for example a needle punching needle with a diameter of about 0.6 mm. Openings (apertures) may be punched into about 1 $cm^2$ area in the center of the rounded part (powder side) of a pouch to form a pouch comprising an apertured film wall material. Each hole may be punched in a way that the needle completely penetrates the film wall material. In another example, the pouch may comprise an apertured film wall material comprising a region of openings (apertures)—an apertured region, and a region of no openings (no apertures)—a non-apertured region.

Apertured films can be made by any number of known techniques. Suitable aperturing processes for films are described in U.S. Pat. No. 2,748,863 entitled "Perforating Machine For Thermoplastic Films" which discloses the use of a perforating cylinder studded with hot pins arranged in annular rows and an anvil roller having grooves that cooperate with the pins in defining a nip wherein thermoplastic films can be perforated. Other suitable processes for aperturing films are described in U.S. Pat. No. 3,929,135, entitled "Absorptive Structures Having Tapered Capillaries", which issued to Thompson on Dec. 30, 1975; U.S. Pat. No. 4,324,246 entitled "Disposable Absorbent Article Having A Stain Resistant Topsheet", which issued to Mullane, et al. on Apr. 13, 1982; U.S. Pat. No. 4,342,314 entitled "Resilient Plastic Web Exhibiting Fiber-Like Properties", which issued to Radel, et al. on Aug. 3, 1982; U.S. Pat. No. 4,463,045 entitled "Macroscopically Expanded Three-Dimensional Plastic Web Exhibiting Non-Glossy Visible Surface and Cloth-Like Tactile Impression", which issued to Ahr, et al. on Jul. 31, 1984; and U.S. Pat. No. 5,006,394 "Multilayer Polymeric Film" issued to Baird on Apr. 9, 1991. Still other processes for aperturing films are described in U.S. patent application US 2012/0273997 entitled "Process For Making A Micro-Textured Web" filed on Apr. 26, 2011 and U.S. Pat. No. 8,241,543 entitled "Method And Apparatus For Making An Apertured Web" issued to O'Donnell, et al. on Aug. 14, 2012. All of the above records are incorporated by reference.

In one example, the apertured film wall material exhibits a basis weight of less than 500 $g/m^2$ and/or less than 400 $g/m^2$ and/or less than 200 $g/m^2$ and/or less than 100 $g/m^2$ as measured "Conditions of intended use" as used herein means the temperature, physical, chemical, and/or mechanical conditions that a pouch and/or its apertured film wall material of the present invention is exposed to when the pouch is used for one or more of its designed purposes. For example, if a pouch of the present invention is designed to be used in a washing machine for laundry care purposes, the conditions of intended use will include those temperature, chemical, physical and/or mechanical conditions present in a washing machine, including any wash water, during a laundry washing operation. In another example, if a pouch of the present invention is designed to be used by a human as a shampoo for hair care purposes, the conditions of intended use will include those temperature, chemical, physical and/or mechanical conditions present during the shampooing of the human's hair. Likewise, if a pouch of the present invention is designed to be used in a dishwashing operation, by hand or by a dishwashing machine, the conditions of intended use will include the temperature, chemical, physical and/or mechanical conditions present in dishwashing water and/or a dishwashing machine, during the dishwashing operation.

"Active agent" as used herein means an additive that produces an intended effect in an environment external to a pouch of the present invention, such as when the pouch is exposed to conditions of intended use. In one example, an active agent comprises an additive that treats a surface, such as a hard surface (i.e., kitchen countertops, bath tubs, toilets, toilet bowls, sinks, floors, walls, teeth, cars, windows, mirrors, dishes) and/or a soft surface (i.e., fabric, hair, skin, carpet, crops, plants). In another example, an active agent comprises an additive that creates a chemical reaction (i.e., foaming, fizzing, coloring, warming, cooling, lathering, disinfecting and/or clarifying and/or chlorinating, such as in clarifying water and/or disinfecting water and/or chlorinating water). In yet another example, an active agent comprises an additive that treats an environment (i.e., deodorizes, purifies, perfumes air).

"Treats" as used herein with respect to treating a surface or an environment means that the active agent provides a benefit to a surface or environment. Treats includes regulating and/or immediately improving a surface's or environment's appearance, cleanliness, smell, purity and/or feel. In one example treating in reference to treating a keratinous tissue surface (for example skin and/or hair) surface means regulating and/or immediately improving the keratinous tissue surface's cosmetic appearance and/or feel. For instance, "regulating skin, hair, or nail (keratinous tissue surface) condition" includes: thickening of skin, hair, or nails (e.g, building the epidermis and/or dermis and/or sub-dermal [e.g., subcutaneous fat or muscle] layers of the skin, and where applicable the keratinous layers of the nail and hair shaft) to reduce skin, hair, or nail atrophy, increasing the convolution of the dermal-epidermal border (also known as the rete ridges), preventing loss of skin or hair elasticity (loss, damage and/or inactivation of functional skin elastin) such as elastosis, sagging, loss of skin or hair recoil from deformation; melanin or non-melanin change in coloration to the skin, hair, or nails such as under eye circles, blotching (e.g., uneven red coloration due to, e.g., rosacea) (hereinafter referred to as "red blotchiness"), sallowness (pale color), discoloration caused by telangiectasia or spider vessels, and graying hair.

In another example, treating means removing stains, soil, and/or odors from fabric articles, such as clothes, towels, linens, and/or hard surfaces, such as countertops and/or dishware including pots and pans.

"Fabric care active agent" as used herein means an active agent that when applied to a fabric article provides a benefit and/or improvement to the fabric article. Non-limiting examples of benefits and/or improvements to a fabric article include cleaning (for example by surfactants), stain removal, stain reduction, wrinkle removal, color restoration, static control, wrinkle resistance, permanent press, wear reduction, wear resistance, pill removal, pill resistance, soil removal, soil resistance (including soil release), shape retention, shrinkage reduction, softness, fragrance, anti-bacterial, anti-viral, odor resistance, and odor removal.

"Dishwashing active agent" as used herein means an active agent that when applied to dishware, glassware, pots, pans, utensils, and/or cooking sheets provides a benefit and/or improvement to the dishware, glassware, plastic items, pots, pans and/or cooking sheets. Non-limiting examples of benefits and/or improvements to the dishware, glassware, plastic items, pots, pans, utensils, and/or cooking sheets include food and/or soil removal, cleaning (for example by surfactants) stain removal, stain reduction, grease removal, water spot removal and/or water spot prevention, glass and metal care, sanitization, shining, and polishing.

"Hard surface active agent" as used herein means an active agent when applied to floors, countertops, sinks, windows, mirrors, showers, baths, and/or toilets provides a benefit and/or improvement to the floors, countertops, sinks, windows, mirrors, showers, baths, and/or toilets. Non-limiting examples of benefits and/or improvements to the floors, countertops, sinks, windows, mirrors, showers, baths, and/or toilets include food and/or soil removal, cleaning (for example by surfactants), stain removal, stain reduction, grease removal, water spot removal and/or water spot prevention, limescale removal, disinfection, shining, polishing, and freshening.

"Water-soluble" and/or "water-soluble material" as used herein means a material that is miscible in water. In other words, a material that is capable of forming a stable (does not separate for greater than 5 minutes after forming the homogeneous solution) homogeneous solution with water at ambient conditions.

"Ambient conditions" as used herein means 23° C.±1.0° C. and a relative humidity of 50%±2%.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

"Triggering condition" as used herein in one example means anything, as an act or event, that serves as a stimulus and initiates or precipitates a change in the pouch of the present invention or its apertured film wall material, such as a loss or altering of the pouch's apertured film wall material's physical structure and/or a rupture and release of an additive, such as an active agent from the pouch. In another example, the triggering condition may be present in an environment, such as water, when a pouch of the present invention is added to the water. In other words, nothing changes in the water except for the fact that the pouch of the present invention is present therein.

"By weight on a dry apertured film wall material basis" and/or "by weight on a dry pouch basis" means the "dry weight" of the apertured film wall material and/or pouch, respectively, measured according to the Water Content Test Method described herein.

"Different from" or "different" as used herein means, with respect to a material, such as an active agent, is chemically, physically and/or structurally different from another material, such as another active agent. For example, starch is different from cellulose. However, different molecular weights of the same material, such as different molecular weights of starch, are not different materials from one another for purposes of the present invention.

"Machine Direction" or "MD" as used herein means the direction parallel to the flow of the apertured film wall material through the apertured film wall material making machine.

"Cross Machine Direction" or "CD" as used herein means the direction perpendicular to the machine direction in the same plane of the apertured film wall material.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Pouch

As shown in FIGS. 1 and 2, an example of a pouch 10 of the present invention comprises a film wall material 12, such as an apertured film wall material 14 comprising a plurality of openings/holes (apertures) 16, for example a water-soluble apertured film wall material. The film wall material 12 defines an internal volume 18 of the pouch 10. Any contents 20 of the pouch 10, for example active agents in the form of powder, laundry detergent compositions, dishwashing compositions, and other cleaning compositions, may be contained and retained in the internal volume 18 of the pouch 10 at least until the pouch 10 ruptures. In one example, the pouch 10 ruptures between and/or around holes 16 within the apertured film wall material 14, for example during use and it releases its contents 20 as shown in FIG. 2.

The pouch 10 under conditions of intended use is represented in FIG. 2. FIG. 2 illustrates the scenario when a user adds the pouch 10 to a liquid 22, such as water, in a container 24, such as a washing machine or dishwashing machine, to create a wash liquor. As shown in FIG. 2, when the pouch 10 contacts the liquid 22 the pouch 10 ruptures, such as by parts of the apertured film wall material 14 dissolving, causing at least a portion if not all of its contents 20 to be released from the internal volume 18 of the pouch 10.

FIG. 3 illustrates another example of a pouch 10 of the present invention. The pouch 10 comprises a film wall material 12 comprising an apertured film wall material 14, for example a water-soluble apertured film wall material, that initially forms an open pouch by being configured such that the internal volume 18 is partially defined by the apertured film wall material 14. An additional film wall material 12, such as an additional apertured film wall material 14 and/or an additional non-apertured film wall material, may be associated with the first apertured film wall material 14 to further define the internal volume 18 by producing a closed pouch. The additional film wall material 12 may be bonded, such as sealed, to the apertured film wall material 14 thus trapping any contents (not shown) in the internal volume 18 of the pouch 10.

In one example, the pouch of the present invention may be a single compartment pouch as illustrated in FIGS. 1-3.

In another example, as shown in FIG. 4, the pouch 10 of the present invention may be a multi-compartment pouch 10 comprising two or more compartments 26, 28 that may contain different active agents and/or different compositions and/or the same active agents and/or the same compositions.

For example, one compartment 26 may contain a fast dissolving active agent and another compartment 28 may contain a slower dissolving active agent relative to the fast dissolving active agent. In still another example, each of the compartments 26, 28 may comprise different film wall materials 12 that dissolve at different rates such that the contents (not shown) of the different compartments 26, 28 are released from their respective compartments 26, 28 at different times during use. This staggered release profile could be used if incompatible materials are contained in the different compartments 26, 28. As shown in FIG. 4, one of the compartments 28 may comprise an apertured film wall material 14, such as a water-soluble apertured film wall material, and the other compartment 26 may comprise a non-apertured film wall material 30, such as a water-soluble non-apertured film wall material. In even another example, a powder composition, such as a powder detergent composition, may be contained in compartment 28 and a liquid composition, such as a liquid detergent composition, may be contained in compartment 26.

In one example, the pouch of the present invention further comprises a discrete inner pouch present in the internal volume of the outer pouch. The inner pouch may comprise a film wall material and/or a fibrous wall material that defines a second internal volume. In one example, the inner pouch comprises an apertured film wall material. In another example, the inner pouch comprises a non-apertured film wall material. The inner pouch's second internal volume may comprise one or more active agents which may be the same or different from any active agents present in the outer pouch's internal volume.

In one example, the inner pouch exhibits an Average Rupture Time equal to or greater than the Average Rupture Time of the outer pouch as measured according to the Rupture Test Method described herein.

Figure 6:
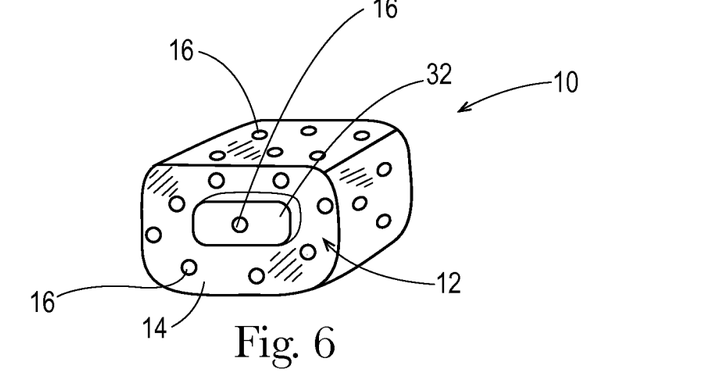
FIG. 6 is a schematic representation of another example of a pouch according to the present invention.
Figure 7:
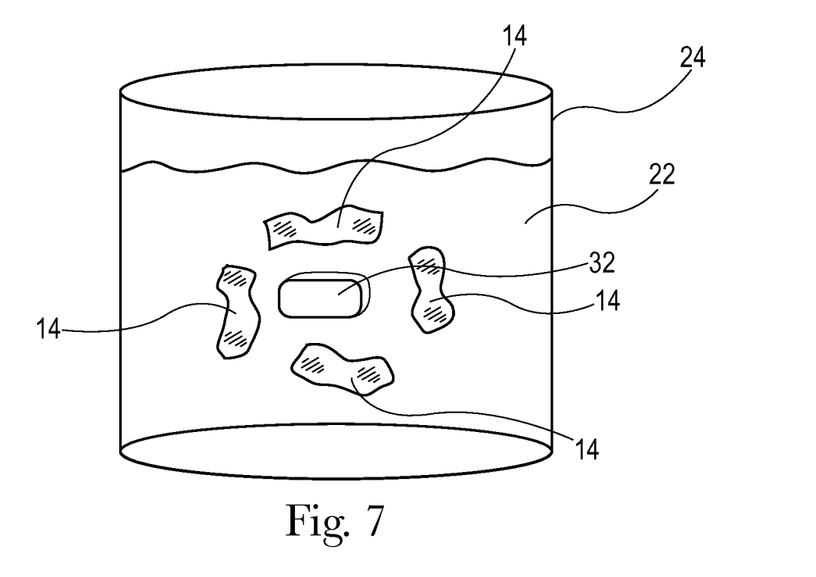
FIG. 7 is a schematic representation of the pouch of FIG. 6 during use.

In yet another example of the present invention, as shown in FIGS. 6 and 7, the pouch 10 may comprise a film wall material 12 comprising an apertured film wall material 14 that defines an internal volume 18 that contains one or more additional pouches, for example a film pouch 32 comprising a non-apertured film wall material, such as a water-soluble non-apertured film wall material. In addition to the film pouch 32, the pouch 10 may comprise further contents such as powder detergent compositions and/or one or more active agents. The film pouch 32 may comprise one or more active agents, for example powder detergent compositions and/or liquid detergent compositions and/or active agents. The film pouch 32 may be released upon the rupturing of pouch 10, such as during use. The contents of pouch 10 and the contents of film pouch 32 may be the same or different. In another example, the additional pouch within pouch 10, film pouch 32, may comprise an apertured film wall material 14 and/or a combination of non-apertured film wall material 30 and apertured film wall material 14.

The pouch 10 of FIG. 6 under conditions of intended use is represented in FIG. 7. FIG. 7 illustrates a scenario when a user adds the pouch 10 to a liquid 22, such as water, in a container 24, such as a washing machine or dishwashing machine, to create a wash liquor. As shown in FIG. 7, when the pouch 10 contacts the liquid 22 the pouch 10 ruptures, such as by part of the apertured film wall material 14 dissolving and initially forming fragments of film wall material 12 for example, causing at least a portion if not all of its contents, for example the film pouch 32, to be released from the internal volume 18 of the pouch 10.

The pouch 10 of the present invention may be of any shape and size so long as it is suitable for its intended use.

In one example, the apertured film wall material may exhibit a uniform or substantially uniform thickness throughout the pouch.

In another example, the pouches of the present invention may exhibit a % Weight Loss of less than 10% and/or less than 5% and/or less than 3% and/or less than 1% and/or less than 0.5% and/or less than 0.1% and/or less than 0.05% and/or about 0% as measured according to the Shake Test Method described herein.

In one example, the apertured film wall materials of the pouches of the present invention may exhibit a % Weight Loss of less than 10% and/or less than 5% and/or less than 3% and/or less than 1% and/or less than 0.5% and/or less than 0.1% and/or less than 0.05% and/or about 0% as measured according to the Shake Test Method described herein and a GM Tensile Strength of greater than 0.1 kN/m and/or greater than 0.25 kN/m and/or greater than 0.4 kN/m and/or greater than 0.45 kN/m and/or greater than 0.50 kN/m and/or greater than 0.75 kN/m as measured according to the Tensile Test Method described herein.

In even another example, the apertured film wall materials of the pouches of the present invention may exhibit a % Weight Loss of less than 10% and/or less than 5% and/or less than 3% and/or less than 1% and/or less than 0.5% and/or less than 0.1% and/or less than 0.05% and/or about 0% as measured according to the Shake Test Method described herein and a Geometric Mean (GM) Elongation at Break of less than 1000% and/or less than 800% and/or less than 650% and/or less than 550% and/or less than 500% and/or less than 475% as measured according to the Tensile Test Method described herein.

Table 1 below shows the % Weight Loss as measured according to the Shake Test Method described herein of examples of pouches of the present invention.

TABLE 1

| Sample | # holes added | % Weight Loss |
|---|---|---|
| Inventive Pouch 1 | 10 | <0.05% |
| Inventive Pouch 2 | 20 | <0.05% |

In one example, the pouch of the present invention comprising a apertured film wall material, for example a water-soluble apertured film wall material, exhibits an Average Rupture Time of less than 240 seconds and/or less than 120 seconds and/or less than 60 seconds and/or less than 30 seconds and/or less than 10 seconds and/or less than 5 seconds and/or less than 2 seconds and/or instantaneous as measured according to the Rupture Test Method described herein.

Table 2 below shows the Average Rupture Time as measured according to the Rupture Test Method described herein of examples of pouches of the present invention.

TABLE 2

| Sample | # holes added | Average Rupture Time (seconds) |
|---|---|---|
| Inventive Pouch 1 | 10 | 11.7 |
| Inventive Pouch 2 | 20 | 11.0 |

Apertured Film Wall Material

The apertured film wall material of the present invention may be used as is or may be coated with one or more active agents.

In one example, the apertured film wall material of the present invention exhibits a thickness of greater than 0.01 mm and/or greater than 0.05 mm and/or greater than 0.1 mm and/or to about 100 mm and/or to about 50 mm and/or to about 20 mm and/or to about 10 mm and/or to about 5 mm and/or to about 2 mm and/or to about 0.5 mm and/or to about 0.3 mm as measured by the Thickness Test Method described herein.

In another example, the apertured film wall material of the present invention exhibits a Geometric Mean (GM) Tensile Strength of greater than 0.1 kN/m and/or greater than 0.25 kN/m and/or greater than 0.4 kN/m and/or greater than 0.45 kN/m and/or greater than 0.50 kN/m and/or greater than 0.75 kN/m as measured according to the Tensile Test Method described herein.

In another example, the apertured film wall material of the present invention exhibits a Geometric Mean (GM) Elongation at Break of less than 1000% and/or less than 800% and/or less than 650% and/or less than 550% and/or less than 500% and/or less than 475% as measured according to the Tensile Test Method described herein.

Table 3 shows the GM Tensile Strength and the GM Elongation of two examples of apertured film wall materials of the present invention and two prior art non-apertured film wall materials.

TABLE 3

| Sample | Apertured? # holes added | Geometric Mean Tensile Strength (kN/m) | Geometric Mean Elongation at Break (%) |
| --- | --- | --- | --- |
| Inventive Apertured Film 1 | Yes - 10 | 1.01 | 351.8% |
| Inventive Apertured Film 2 | Yes - 20 | 1.25 | 356.5% |
| Prior Art Non-apertured Film 1 | No - None | 1.14 | 410.8% |
| Prior Art Non-apertured Film 2 | No - 1 | 1.06 | 276.8% |

In one example, the apertured film wall material of the present invention exhibits an average Dissolution Time of less than 24 hours and/or less than 12 hours and/or less than 6 hours and/or less than 1 hour (3600 seconds) and/or less than 30 minutes and/or less than 25 minutes and/or less than 20 minutes and/or less than 15 minutes and/or less than 10 minutes and/or less than 5 minutes and/or greater than 1 second and/or greater than 5 seconds and/or greater than 10 seconds and/or greater than 30 seconds and/or greater than 1 minute as measured according to the Dissolution Test Method described herein.

In one example, the apertured film wall material of the present invention exhibits an average Dissolution Time per gsm of sample of about 10 seconds/gsm (s/gsm) or less, and/or about 5.0 s/gsm or less, and/or about 3.0 s/gsm or less, and/or about 2.0 s/gsm or less, and/or about 1.8 s/gsm or less, and/or about 1.5 s/gsm or less as measured according to the Dissolution Test Method described herein.

In one example, the apertured film wall material comprises a polymer, such as a film-forming polymer. The apertured film wall material can, for example, be obtained by casting, blow-moulding, extrusion or blown extrusion of the polymeric material, as known in the art.

Non-limiting examples of suitable polymers, copolymers and/or derivatives thereof for use as a film wall material are selected from the group consisting of: polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum.

In one example, the polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates. In another example, the polymers are selected from polyvinyl alcohols, polyvinyl alcohol copolymers and hydroxypropyl methyl cellulose (HPMC), and combinations thereof. In one example, the level of polymer in the pouch material, for example a polyvinyl alcohol polymer, is at least 60%.

In one example, the apertured film wall material comprises a hydroxyl polymer. Non-limiting examples of suitable hydroxyl polymers include pullulan, hydroxypropylmethyl cellulose, hydroxyethyl cellulose, hydroxypropyl cellulose, carboxymethyl cellulose, sodium alginate, xanthan gum, tragacanth gum, guar gum, acacia gum, Arabic gum, polyacrylic acid, dextrin, pectin, chitin, collagen, gelatin, zein, gluten, soy protein, casein, polyvinyl alcohol, starch, starch derivatives, hemicellulose, hemicellulose derivatives, proteins, chitosan, chitosan derivatives, polyethylene glycol, tetramethylene ether glycol, hydroxymethyl cellulose, and mixtures thereof.

The polymer may exhibit a weight average molecular weight of from about 1000 to about 1,000,000 g/mol and/or from about 10,000 to about 300,000 g/mol and/or from about 20,000 to about 150,000 g/mol.

Mixtures of polymers can also be used as the film wall material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of polyvinyl alcohol or a copolymer thereof of a weight average molecular weight of from about 10,000 to about 40,000 g/mol and/or about 20,000 g/mol, and of polyvinyl alcohol or copolymer thereof with a weight average molecular weight of from about 100,000 to about 300,000 g/mol and/or about 150,000 g/mol.

Also suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol.

In one example, the polymers comprise polymers which are from about 60% to about 98% hydrolyzed and/or about 80% to about 90% hydrolyzed to improve the dissolution characteristics of the material.

In another example, the film wall materials comprise polyvinyl alcohol films known under the trade name Monosol M8630, as sold by Chris-Craft Industrial Products of Gary, Ind., US, and polyvinyl alcohol films of corresponding solubility and deformability characteristics. Other films suitable for use herein include films known under the trade name PT film and/or the K-series of films supplied by Aicello, or VF-HP film supplied by Kuraray.

The film wall material herein can also comprise one or more additive ingredients. For example, it can be beneficial to add plasticisers, for example glycerol, ethylene glycol, diethyleneglycol, propylene glycol, sorbitol and mixtures thereof. Other additives may include one or more active agents.

In one example, the apertured film wall material and/or dry pouch made therefrom comprises less than 20% and/or less than 15% and/or less than 10% and/or less than 7% and/or less than 5% and/or less than 3% and/or to 0% and/or to greater than 0% based on the dry weight of the apertured film wall material and/or pouch of moisture, such as water, for example free water, as measured according to the Water Content Test Method described herein. In one example, the pouch exhibits a water content of from about 0% to about 20% as measured according to the Water Content Test Method described herein.

Active Agents

Active agents are a class of additives that are designed and intended to provide a benefit to something other than the apertured film wall material and/or pouch itself, such as providing a benefit to an environment external to the apertured film wall material and/or pouch. Active agents may be any suitable additive that produces an intended effect under conditions of intended use. For example, the active agent may be selected from the group consisting of: personal cleansing and/or conditioning agents such as hair care agents such as shampoo agents and/or hair colorant agents, hair conditioning agents, skin care agents, sunscreen agents, and skin conditioning agents; laundry care and/or conditioning agents such as fabric care agents, fabric conditioning agents, fabric softening agents, fabric anti-wrinkling agents, fabric care anti-static agents, fabric care stain removal agents, soil release agents, dispersing agents, suds suppressing agents, suds boosting agents, anti-foam agents, and fabric refreshing agents; liquid and/or powder dishwashing agents (for hand dishwashing and/or automatic dishwashing machine applications), hard surface care agents, and/or conditioning agents and/or polishing agents; other cleaning and/or conditioning agents such as antimicrobial agents, antibacterial agents, antifungal agents, fabric hueing agents, perfume, bleaching agents (such as oxygen bleaching agents, hydrogen peroxide, percarbonate bleaching agents, perborate bleaching agents, chlorine bleaching agents), bleach activating agents, chelating agents, builders, lotions, brightening agents, air care agents, carpet care agents, dye transfer-inhibiting agents, clay soil removing agents, anti-redeposition agents, polymeric soil release agents, polymeric dispersing agents, alkoxylated polyamine polymers, alkoxylated polycarboxylate polymers, amphilic graft copolymers, dissolution aids, buffering systems, water-softening agents, water-hardening agents, pH adjusting agents, enzymes, flocculating agents, effervescent agents, preservatives, cosmetic agents, make-up removal agents, lathering agents, deposition aid agents, coacervate-forming agents, clays, thickening agents, latexes, silicas, drying agents, odor control agents, antiperspirant agents, cooling agents, warming agents, absorbent gel agents, anti-inflammatory agents, dyes, pigments, acids, and bases; liquid treatment active agents; agricultural active agents; industrial active agents; ingestible active agents such as medicinal agents, teeth whitening agents, tooth care agents, mouthwash agents, periodontal gum care agents, edible agents, dietary agents, vitamins, minerals; water-treatment agents such as water clarifying and/or water disinfecting agents, and mixtures thereof.

Non-limiting examples of suitable cosmetic agents, skin care agents, skin conditioning agents, hair care agents, and hair conditioning agents are described in CTFA Cosmetic Ingredient Handbook, Second Edition, The Cosmetic, Toiletries, and Fragrance Association, Inc. 1988, 1992.

One or more classes of chemicals may be useful for one or more of the active agents listed above. For example, surfactants may be used for any number of the active agents described above. Likewise, bleaching agents may be used for fabric care, hard surface cleaning, dishwashing and even teeth whitening. Therefore, one of ordinary skill in the art will appreciate that the active agents will be selected based upon the desired intended use of the pouch of the present invention.

For example, if the pouch is designed to be used for hair care and/or conditioning then one or more suitable surfactants, such as a lathering surfactant could be selected to provide the desired benefit to a consumer when exposed to conditions of intended use of the pouch.

In one example, if the pouch is designed or intended to be used for laundering clothes in a laundry operation, then one or more suitable surfactants and/or enzymes and/or builders and/or perfumes and/or suds suppressors and/or bleaching agents could be selected to provide the desired benefit to a consumer when exposed to conditions of intended use of the pouch. In another example, if the pouch is designed to be used for laundering clothes in a laundry operation and/or cleaning dishes in a dishwashing operation, then the pouch may comprise a laundry detergent composition or dishwashing detergent composition or active agents used in such compositions. In still another example, if the pouch is designed to be used for cleaning and/or sanitizing a toilet bowl, then the pouch may comprise a toilet bowl cleaning composition and/or effervescent composition and/or active agents used in such compositions.

In one example, the active agent is selected from the group consisting of: surfactants, bleaching agents, enzymes, suds suppressors, suds boosting agents, fabric softening agents, denture cleaning agents, hair cleaning agents, hair care agents, personal health care agents, hueing agents, effervescent agents, and mixtures thereof.

In another example, the active agent is in the form of a powder and/or particulate.

In one example, the pouch of the present invention comprises at least 5 g and/or at least 10 g and/or at least 15 g of active agents within its internal volume.

In another example, the pouch of the present invention comprises a bleaching agents, citric acid, and perfume.

Methods for Making a Pouch

The pouch of the present invention may be made by any suitable process known in the art so long as an apertured film wall material, for example a water-soluble apertured film wall material of the present invention is used to form at least a portion of the pouch.

In one example, pouch may be made using any suitable equipment and method. Single compartment pouches may be made using vertical or horizontal form filling techniques commonly known in the art. Non-limiting examples of suitable processes for making water-soluble pouches, albeit with non-apertured film wall materials, are described in EP 1504994, EP 2258820, and WO02/40351 (all assigned to The Procter & Gamble Company), which are incorporated herein by reference.

In another example, the process for preparing the pouches of the present invention may comprise the step of shaping pouches from an apertured film wall material in a series of molds, wherein the molds are positioned in an interlocking manner. By shaping, it is typically meant that the apertured wall material is placed onto and into the molds, for example, the apertured film wall material may be vacuum pulled into the molds, so that the apertured film wall material is flush with the inner walls of the molds. This is commonly known as vacuum forming. Another method, is thermo-forming to get the apertured film wall material to adopt the shape of the mold.

Thermo-forming typically involves the step of formation of an open pouch in a mold under application of heat, which allows the apertured film wall material used to make the pouches to take on the shape of the molds. This process may also be used to create apertures in film wall material to form apertured film wall materials.

Vacuum-forming typically involves the step of applying a (partial) vacuum (reduced pressure) on a mold which pulls the apertured film wall material into the mold and ensures the apertured film wall material adopts the shape of the mold. The pouch forming process may also be done by first heating the apertured film wall material and then applying reduced pressure, e.g. (partial) vacuum.

The apertured film wall material is typically sealed by any sealing means. For example, by heat sealing, wet sealing or by pressure sealing. In one example, a sealing source is contacted to the apertured film wall material and heat or pressure is applied to the apertured film wall material, and the apertured film wall material is sealed. The sealing source may be a solid object, for example a metal, plastic or wood object. If heat is applied to the apertured film wall material during the sealing process, then said sealing source is typically heated to a temperature of from about 40° C. to about 200° C. If pressure is applied to the apertured film wall material during the sealing process, then the sealing source typically applies a pressure of from about $1 \times 10^4 Nm^{-2}$ to about $1 \times 10^6 Nm^{-2}$, to the apertured film wall material.

In another example, the same piece of apertured film wall material may be folded, and sealed to form the pouches. Typically more than one piece of apertured film wall material is used in the process. For example, a first piece of the apertured film wall material may be vacuum pulled into the molds so that the apertured film wall material is flush with the inner walls of the molds. A second piece of film wall material, apertured or non-apertured, may be positioned such that it at least partially overlaps and/or completely overlaps, with the first piece of apertured film wall material. The first piece of apertured film wall material and second piece of film wall material are sealed together. The first piece of apertured film wall material and second piece of film wall material can be the same or different.

In another example of making a pouch of the present invention, a first piece of the apertured film wall material may be vacuum pulled into the molds so that the apertured film wall material is flush with the inner walls of the molds. One or more active agents and/or a detergent composition, may be added to, for example poured into, the open pouches (internal volume) in the molds, and a second film wall material, apertured or non-apertured, may be placed over the active agents and/or detergent composition and in contact with the first apertured film wall material and the first piece of apertured film wall material and second piece of film wall material are sealed together to form pouches, typically in such a manner as to at least partially enclose and/or completely enclose its internal volume and the active agents and/or detergent composition within its internal volume.

In another example, the pouch making process may be used to prepare pouches which have an internal volume that is divided into more than one compartment, typically known as a multi-compartment pouches. In the multi-compartment pouch process, the apertured film wall material is folded at least twice, or at least three pieces of apertured film wall materials are used, or at least two pieces of apertured film wall materials are used wherein at least one piece of apertured film wall material is folded at least once. The third piece of apertured film wall material, when present, or a folded piece of apertured film wall material, when present, creates a barrier layer that, when the pouch is sealed, divides the internal volume of said pouch into at least two compartments.

In another example, a process for making a multi-compartment pouch comprises fitting a first piece of the apertured film wall material into a series of molds, for example the first piece of apertured film wall material may be vacuum pulled into the molds so that the apertured film wall material is flush with the inner walls of the molds. Active agents are typically poured into the open pouch formed by the first piece of apertured film wall material in the molds. A pre-sealed compartment made of a apertured film wall material can then be placed over the molds containing the active agents. These pre-sealed compartments and said first piece of apertured film wall material may be sealed together to form multi-compartment pouches, for example, dual-compartment pouches.

The pouches obtained from the processes of the present invention may be water-soluble. The pouches are typically closed structures, made of an apertured film wall material described herein, typically enclosing an internal volume which may comprise one or more active agents and/or a detergent composition. The apertured film wall material is suitable to hold active agents, e.g. without allowing the release of the active agents from the pouch prior to contact of the pouch with water. The exact execution will depend on for example, the type and amount of the active agents in the pouch, the number of compartments in the pouch, the characteristics required from the pouch to hold, protect and deliver or release the active agents.

For multi-compartment pouches, the active agents and/or compositions contained in the different compartments may be the same or different. For example, incompatible ingredients may be contained in different compartments.

The pouches of the present invention may be of such a size that they conveniently contain either a unit dose amount of the active agents herein, suitable for the required operation, for example one wash, or only a partial dose, to allow the consumer greater flexibility to vary the amount used, for example depending on the size and/or degree of soiling of the wash load. The shape and size of the pouch is typically determined, at least to some extent, by the shape and size of the mold.

The multi-compartment pouches of the present invention may further be packaged in an outer package. The outer package may be a see-through or partially see-through container, for example a transparent or translucent bag, tub, carton or bottle. The package can be made of plastic or any other suitable material, provided the material is strong enough to protect the pouches during transport. This kind of package is also very useful because the user does not need to open the package to see how many pouches remain in the package. Alternatively, the package may have non-seethrough outer packaging, perhaps with indicia or artwork representing the visually-distinctive contents of the package.

Non-Limiting Example for Making a Pouch

An example of a pouch of the present invention may be made as follows. Cut two layers of film wall materials at least twice the size of the pouch size intended to make. For example if finished pouch size has a planar footprint of about 2 inches×2 inches, then the film wall materials are cut 5 inches×5 inches. Next, lay both layers on top of one another on the heating element of an impulse sealer (Impulse Sealer model TISH-300 from TEW Electric Heating Equipment CO., LTD, 7F, No. 140, Sec. 2, Nan Kang Road, Taipei, Taiwan). The position of the layers on the heating element should be where a side closure seam is to be created. Close the sealer arm for 1 second to seal the two layers together. In a similar way, seal two more sides to create two additional side closure seams. With the three sides sealed, the two film wall materials form a pocket. Next, add the appropriate amount of powder into the pocket and then seal the last side to create the last side closure seam. A pouch is now formed. For most film wall material which are less than 0.2 mm thick, heating dial setting of 4 and heating time 1 second is used. Depending on the film wall materials, heating temperature and heating time might have to be adjusted to realize a desirable seam. If the temperature is too low or the heating time is not long enough, the film wall material may not sufficiently melt and the two layers come apart easily; if the temperature is too high or the heating time is too long, pin holes may form at the sealed edge. One should adjust the sealing equipment conditions so as to the layers to melt and form a seam but not introduce negatives such as pin holes on the seam edge. Once the seamed pouch is formed, a scissor is used to trim off the excess material and leave a 1-2 mm edge on the outside of the seamed pouch.

Methods of Use

The pouches of the present invention comprising one or more active agents, for example one or more fabric care active agents, according the present invention may be utilized in a method for treating a fabric article. The method of treating a fabric article may comprise one or more steps selected from the group consisting of: (a) pre-treating the fabric article before washing the fabric article; (b) contacting the fabric article with a wash liquor formed by contacting the pouch with water; (c) contacting the fabric article with the pouch in a dryer; (d) drying the fabric article in the presence of the pouch in a dryer; and (e) combinations thereof.

In some embodiments, the method may further comprise the step of pre-moistening the pouch prior to contacting it to the fabric article to be pre-treated. For example, the pouch may be pre-moistened with water and then adhered to a portion of the fabric article comprising a stain that is to be pre-treated. Alternatively, the fabric article may be moistened and the pouch placed on or adhered thereto. In some embodiments, the method may further comprise the step of selecting of only a portion of the pouch for use in treating a fabric article. For example, if only one fabric article is to be treated, a portion of the pouch may be cut and/or torn away and either placed on or adhered to the fabric article or placed into water to form a relatively small amount of wash liquor which is then used to pre-treat the fabric article. In this way, the user may customize the fabric treatment method according to the task at hand. In some embodiments, at least a portion of a pouch may be applied to the fabric article to be treated using a device. Exemplary devices include, but are not limited to, brushes, sponges and tapes. In yet another embodiment, the pouch may be applied directly to the surface of the fabric article. Any one or more of the aforementioned steps may be repeated to achieve the desired fabric treatment benefit for a fabric article.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 2 hours prior to the test. The samples tested are "usable units." "Usable units" as used herein means sheets, flats from roll stock, pre-converted flats, sheet, and/or single or multi-compartment products. All tests are conducted under the same environmental conditions and in such conditioned room. Do not test samples that have defects such as wrinkles, tears, holes, and the like. Samples conditioned as described herein are considered dry samples (such as "dry pouches") for testing purposes. All instruments are calibrated according to manufacturer's specifications.

Basis Weight Test Method

Basis weight of an apertured film wall material is measured on stacks of twelve usable units using a top loading analytical balance with a resolution of ±0.001 g. The balance is protected from air drafts and other disturbances using a draft shield. A precision cutting die, measuring 3.500 in±0.0035 in by 3.500 in±0.0035 in is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in lbs/3000 ft$^2$ or g/m$^2$ as follows:

$$\text{Basis Weight} = (\text{Mass of stack})/[(\text{Area of 1 square in stack}) \times (\text{No. of squares in stack})]$$

For example, $$\text{Basis Weight(lbs/3000 ft}^2\text{)} = [[\text{Mass of stack(g)}/453.6 \text{ (g/lbs)}]/[12.25(\text{in}^2)/144(\text{in}^2/\text{ft}^2) \times 12]] \times 3000$$

or, $$\text{Basis Weight(g/m}^2\text{)} = \text{Mass of stack(g)}/[79.032(\text{cm}^2)/10,000(\text{cm}^2/\text{m}^2) \times 12]$$

Report result to the nearest 0.1 lbs/3000 ft$^2$ or 0.1 g/m$^2$. Sample dimensions can be changed or varied using a similar precision cutter as mentioned above, so as at least 100 square inches of sample area in stack.

Water Content Test Method

The water (moisture) content present in an apertured film wall material and/or pouch is measured using the following Water Content Test Method. An apertured film wall material or portion thereof in the form of a pre-cut sheet and/or pouch ("sample") is placed in a conditioned room at a temperature of 23° C.±1.0° C. and a relative humidity of 50%±2% for at least 24 hours prior to testing. Each sample has an area of at least 4 square inches, but small enough in size to fit appropriately on the balance weighing plate. Under the temperature and humidity conditions mentioned above, using a balance with at least four decimal places, the weight of the sample is recorded every five minutes until a change of less than 0.5% of previous weight is detected during a 10 minute period. The final weight is recorded as the "equilibrium weight". Within 10 minutes, the samples are placed into the forced air oven on top of foil for 24 hours at 70° C.±2° C. at a relative humidity of 4%±2% for drying. After the 24 hours of drying, the sample is removed and weighed within 15 seconds. This weight is designated as the "dry weight" of the sample.

The water (moisture) content of the sample is calculated as follows:

$$\% \text{ Water in sample} = 100\% \times \left( \frac{\text{Equilibrium weight of sample} - \text{Dry weight of sample}}{\text{Dry weight of sample}} \right)$$

The % Water (moisture) in sample for 3 replicates is averaged to give the reported % Water (moisture) in sample. Report results to the nearest 0.1%.

Rupture Test Method

Apparatus and Materials:

2000 mL glass beaker 50 (approximately 7.5 inch tall by 5.5 inch in diameter)

Magnetic Stirrer Plate 52 (Labline, Melrose Park, Ill., Model No. 1250 or equivalent)

Magnetic Stirring Rod 54 (2 inch long by ⅜ inch in diameter, Teflon coated)

Thermometer (1 to 100° C.+/−1° C.)

1.25 inch paper binder clip

Alligator clamp (about one inch long) 56

Depth adjuster rod 58 and holder 60 with base 62

Timer (accurate to at least 0.1 second)

Deionized water (equilibrated at 23° C.±1° C.)

Sample Preparation:

For the rupture test, pouch samples are equilibrated at 23° C.±1° C. and 50%±2% relative humidity for at least 24 hours prior to testing. The rupture test is conducted under this temperature and relative humidity condition as well.

Figures 8, 9:
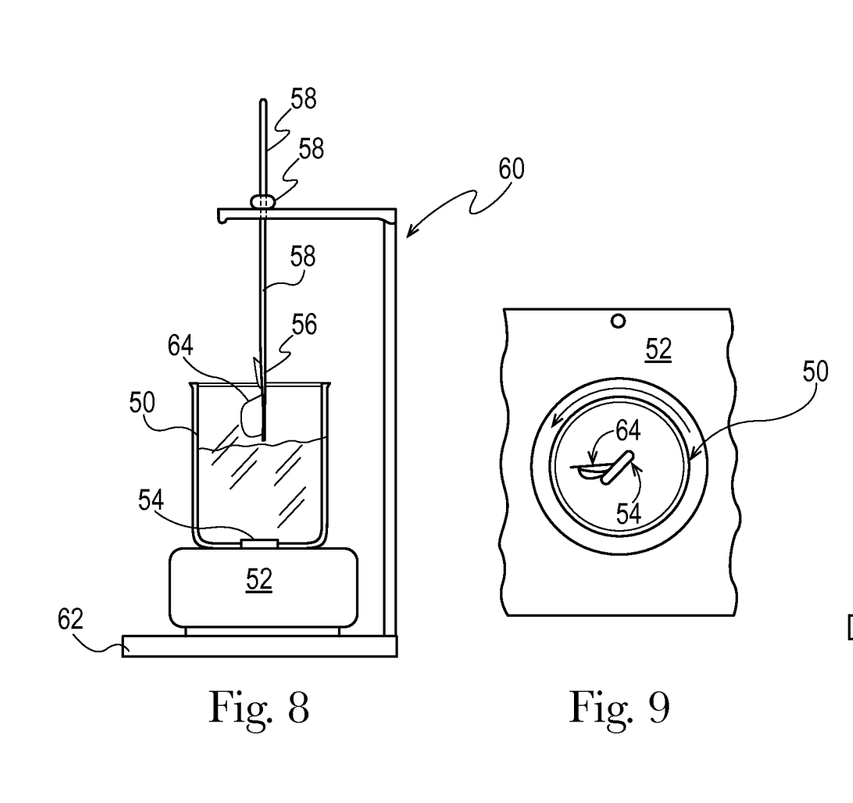
FIG. 8 is a front elevational view of a set-up for the Rupture and Dissolution Test Methods.
FIG. 9 is a partial top view of FIG. 8.
Figure 10:
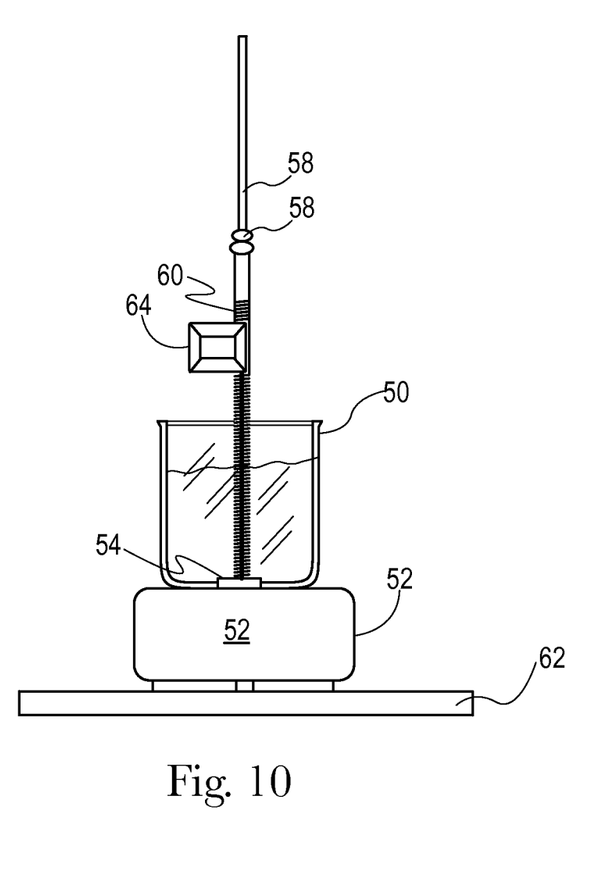
FIG. 10 is a side elevational view of FIG. 8.

Equipment Setup:

As shown in FIGS. 8-10, a 2000 mL glass beaker 50 is filled with 1600±5 mL deionized water and placed on top of a magnetic stirrer plate 52. A magnetic stirring rod 54 is placed at the bottom of the beaker 50. The stirring speed is adjusted so that a steady vortex develops at the center of the beaker 50 with the vortex bottom at the 1200 mL mark.

A trial run may be necessary to ensure the depth adjuster rod is set up properly for the particular pouch to be tested. A pouch 64 is secured by its edge into the clasp of a paper binder clip, which is hung onto an alligator clamp 56 with one of its two wire handles. The alligator clamp 56 is soldiered to the end of a depth adjuster rod 58. The depth adjuster rod 58 is set up in a way, so that when the paper binder clip is lowered into the water, the entire pouch 64 is completely submerged in the water at the center of the beaker 50, the top of the pouch 64 is at the bottom of the vortex, and the bottom of the pouch 64 is not in direct contact with the stirring bar 54. Due to the different dimensions of different pouch samples, the depth adjuster rod 58 may need to be adjusted for each kind of pouch sample.

Test Protocol:

The pouch 64, which is indirectly attached to the depth adjuster rod 58, is dropped into the water in one motion and the timer is started immediately. The pouch 64 is closely monitored visually. The Rupture Time is defined as when the pouch initially breaks apart, releasing its contents, such as powders, into the water, which means the pouch ruptures.

Three replicates of each sample are measured and the average rupture times are reported to within +/−0.1 seconds.

Dissolution Test Method

Apparatus and Materials:

For the dissolution test, the same apparatus set up (FIGS. 8-10) as used in the Rupture Test Method is used except a 35 mm Slide Mount and 35 mm Slide Holder is used to hold a portion of an apertured film wall material in the alligator clamp 56 instead of the alligator clamp 56 simply holding a pouch.

2000 mL glass beaker 50 (approximately 7.5 inch tall by 5.5 inch in diameter)

Magnetic Stirrer Plate 52 (Labline, Melrose Park, Ill., Model No. 1250 or equivalent)

Magnetic Stirring Rod 54 (2 inch long by ⅜ inch in diameter, Teflon coated)

Thermometer (1 to 100° C.+/−1° C.)

1.25 inch paper binder clip

Alligator clamp (about one inch long) 56

Depth adjuster rod 58 and holder 60 with base 62

Timer (accurate to at least 0.1 second)

Deionized water (equilibrated at 23° C.±1° C.)

Cutting Die—Stainless Steel cutting die with dimensions 3.8 cm×3.2 cm

Polaroid 35 mm Slide Mount (commercially available from Polaroid Corporation or equivalent) 35 mm Slide Mount Holder (or equivalent)

Sample Preparation

Equilibrate samples of apertured film wall materials in constant temperature and humidity environment of at 23° C.±1° C. and 50%±2% relative humidity for at least 24 hours prior to testing. The dissolution test is conducted under this temperature and relative humidity condition as well.

Measure the basis weight of the sample materials using Basis Weight Method defined herein.

Cut three dissolution test specimens from an apertured film wall material sample to be tested using cutting die (3.8 cm×3.2 cm), so it fits within the 35 mm slide mount which has an open area dimensions 24×36 mm.

Lock each specimen in a separate 35 mm slide mount.

Equipment Setup:

As shown in FIGS. 8-10, a 2000 mL glass beaker 50 is filled with 1600±5 mL deionized water and placed on top of a magnetic stirrer plate 52. A magnetic stirring rod 54 is placed at the bottom of the beaker 50. The stirring speed is adjusted so that a steady vortex develops at the center of the beaker 50 with the vortex bottom at the 1200 mL mark.

A trial run may be necessary to ensure the depth adjuster rod is set up properly. Secure the 35 mm slide mount in the alligator clamp 56 of the 35 mm slide mount holder such that the long end of the slide mount is parallel to the water surface. The alligator clamp 56 should be positioned in the middle of the long end of the slide mount. The alligator clamp 56 is soldiered to the end of a depth adjuster rod 58. The depth adjuster rod 58 is set up in a way, so that when the paper binder clip is lowered into the water, the entire apertured film wall material specimen is completely submerged in the water at the center of the beaker 50, the top of the apertured film wall material specimen is at the bottom of the vortex, and the bottom of the slide mount/slide mount holder is not in direct contact with the stirring bar 54. The depth adjuster rod 58 and alligator clamp 56 should be set so that the position of the apertured film wall material specimen's surface is perpendicular to the flow of the water.

In one motion, drop the secured slide and clamp into the water and start the timer. The apertured film wall material specimen is dropped so that the apertured film wall material specimen is centered in the beaker. When all of the visible apertured film wall material specimen is released from the slide mount, raise the slide out of the water while continuing the monitor the solution for undissolved apertured film wall material specimen fragments. Dissolution occurs when all apertured film wall material specimen fragments are no longer visible. Record this as the dissolution time.

Three replicates of each apertured film wall material specimen are run and the average dissolution times are reported to within +/−0.1 seconds. Average dissolution time is in units of seconds.

The average dissolution times are normalized for basis weight by dividing each by the apertured film wall material specimen basis weight as determined by the Basis Weight Method defined herein. Basis weight normalized average dissolution times are in units of seconds/gsm of sample (s/(g/m2)).

Tensile Test Method
Apparatus and Materials:
  Box cutter or utility knife
  Scissors
  1 inch Precision Die Cutter (model No. JDC25 made by Thwing-Albert Instrument Company, 14 W Collings Ave, West Berlin, N.J. 08091) or equivalent
Sample Preparation:

Using a box cutter, a corner of the pouch is cut open along its edge. After most of the pouch content is emptied out, using a pair of scissors, a sample of the film wall material is cut out along the pouch edge. The film wall material is then gently wiped clean to remove any residue. Any damage to the film wall material, such as stretching, scraping, pinching, puncturing, is avoided during sample preparation step. If the film wall material is damaged (i.e., torn, stretched, cut, punctured, etc.) as a result of separating the wall material from the pouch, the sample is discarded and another undamaged one is prepared.

The tensile property of film wall material may depend on the direction of applied deformation in relative to its manufacturing orientation, i.e. machine direction (MD) and cross direction (CD). If the MD and CD are not apparent, the longer axial direction parallel to one edge of the pouch is assumed to be the MD and the orthogonal direction is assumed to be the CD. Or if the emptied pouch is almost square, again, assume an axial direction parallel to one edge of the pouch is assumed to be the MD and the orthogonal direction is assumed to be the CD.

The pouch wall samples are cut to a dimension of 25.4 mm (1 inch) by 12.7 mm (0.5 inch) using a precision die cutter. The samples are equilibrated at 23±1° C. and 50%±2% relative humidity for at least 24 hours prior to testing. The tensile tests are performed in accordance with ASTM D882-02 at 23° C.±1° C. and 50%±2% relative humidity, along with the exceptions and/or conditions set forth below.

Test Protocol:

Due to the size of a typical pouch, initial gauge length is chosen to be 6.35 mm (0.25 inch) and gauge width is 25.4 mm (1 inch). Tensile Strength and Elongation at Break are measured using a constant rate extension tensile tester with computer interface, such as an Instron Tension tester Model 5569 (made by Instron Corporation, 825 University Ave, Norwood, Mass. 02062) equipped with the Bluehill® Materials Testing software version 2.18. Testing speed is set at 500 mm/minute. Both the upper movable and lower stationary pneumatic jaws are fitted with smooth stainless steel faced grips, 25.4 mm in height and wider than the width of the test specimen. An air pressure of about 60 psi is supplied to the jaws. A suitable load cell is chosen so that the calculated tensile strength is accurate to +/−0.01 kN/m.

Tensile Strength is defined as the maximum peak force (kN) divided by the sample width (m) and reported as kN/m to the +/−0.01 kN/m.

Elongation at Break is defined as the extension where the force has dropped to 10% of its maximum divided by the initial gauge length multiplied by 100 and reported as % to +/−0.1%.

Three replicates of each sample along the MD and the CD are tested.
Calculations:

Geometric Mean Tensile Strength=Square Root of [MD Tensile Strength(kN/m)×CD Tensile Strength(kN/m)]

Geometric Mean Elongation at Break=Square Root of [MD Elongation at Break(%)×CD Elongation at Break(%)]

Shake Test Method
Apparatus and Materials:
  850 micron sieve (8 inch in diameter)
  Solid pan (8 inch in diameter) that fits underneath the sieve
  Lab-Line Orbit Environ Shaker Model No. 3528 (made by Lab-Line Instrument Inc., Melrose Park, Ill. 60160) or the equivalent
  Balance (accurate to 0.0001 gram)
Sample Preparation:

Pouch samples are equilibrated at 23° C.±1° C. and 50%±2% relative humidity for at least 24 hours prior to testing. The shake test is conducted under the same temperature and relative humidity condition.

Test Protocol:

Before the shake test is conducted, the mass of the pouch is measured to within +/−0.1 mg. The pouch sample is placed at the center of the sieve, which sits on the solid pan. Both the sieve and the pan are placed onto the shaker plate. The shake rate is set to 150-170 rpm for 10 minutes. The mass of the pouch is measured again after the shake test to within +/−0.1 mg.

Three replicates of each sample are tested. The percent weight loss is calculated based on the mass of the pouch before and after shaking and is reported to +/−0.1%.

Thickness Test Method

Thickness of an apertured film wall material is measured by cutting 5 samples of an apertured film wall material sample such that each cut sample is larger in size than a load foot loading surface of a VIR Electronic Thickness Tester Model II available from Thwing-Albert Instrument Company, Philadelphia, Pa. Typically, the load foot loading surface has a circular surface area of about 3.14 in$^2$. The sample is confined between a horizontal flat surface and the load foot loading surface. The load foot loading surface applies a confining pressure to the sample of 15.5 g/cm$^2$. The thickness of each sample is the resulting gap between the flat surface and the load foot loading surface. The thickness is calculated as the average thickness of the five samples. The result is reported in millimeters (mm).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble, single compartment pouch comprising a water-soluble apertured film wall material comprising one or more active agents, wherein the water-soluble apertured film wall material defines an internal volume of the pouch comprising an active agent within the internal volume of the pouch, wherein the pouch comprises 0% free water as measured according to the Water Content Test Method and wherein the pouch comprises a seam, and wherein the pouch ruptures when exposed to conditions of intended use and wherein the apertured film wall material comprises apertures having a diameter of from about 0.5 mm to about 2 mm.

2. The pouch according to claim 1 wherein the pouch ruptures as measured according to the Rupture Test Method.

3. The pouch according to claim 2 wherein the pouch exhibits an Average Rupture Time of less than 240 seconds as measured according to the Rupture Test Method.

4. The pouch according to claim 1 wherein the apertured film wall material comprises a hydroxyl polymer.

5. The pouch according to claim 4 wherein the hydroxyl polymer is selected from the group consisting of: pullulan, hydroxypropylmethyl cellulose, hydroxyethyl cellulose, hydroxypropyl cellulose, carboxymethyl cellulose, sodium alginate, xanthan gum, tragacanth gum, guar gum, acacia gum, Arabic gum, polyacrylic acid, dextrin, pectin, chitin, collagen, gelatin, zein, gluten, soy protein, casein, polyvinyl alcohol, starch, starch derivatives, hemicellulose, hemicellulose derivatives, proteins, chitosan, chitosan derivatives, polyethylene glycol, tetramethylene ether glycol, hydroxymethyl cellulose, and mixtures thereof.

6. The pouch according to claim 1 wherein the active agent is selected from the group consisting of: surfactants, bleaching agents, enzymes, suds suppressors, suds boosting agents, fabric softening agents, denture cleaning agents, hair cleaning agents, hair care agents, personal health care agents, hueing agents, effervescent agents, and mixtures thereof.

7. The pouch according to claim 1 wherein the pouch exhibits a % Weight Loss of less than 10% as measured according to the Shake Test Method.

8. The pouch according to claim 1 wherein the pouch releases one or more of the active agents when the pouch is exposed to conditions of intended use.

9. The pouch according to claim 1 wherein the apertured film wall material comprises a regular pattern of apertures.

10. The pouch according to claim 1 wherein the apertured film wall material comprises apertures that form an open area of from about 0.5% to about 25%.

11. The pouch according to claim 1 wherein the apertured film wall material comprises apertures having a diameter of from about 0.5 mm to about 1 mm.

12. The pouch according to claim 1 wherein the apertured film wall material exhibits a thickness of greater than 0.01 mm as measured by the Thickness Test Method.

13. The pouch according to claim 1 wherein the apertured film wall material exhibits a Geometric Mean Tensile Strength of greater than 0.1 kN/m as measured according to the Tensile Test Method.

14. The pouch according to claim 1 wherein the apertured film wall material exhibits a Geometric Mean Elongation at Break of less than 1000% as measured according to the Tensile Test Method.

15. The pouch according to claim 1 wherein the apertured film wall material exhibits an average Dissolution Time of less than 24 hours as measured according to the Dissolution Test Method.

16. The pouch according to claim 1 wherein the apertured film wall material exhibits an average Dissolution Time per gsm of sample of about 10 seconds/gsm or less as measured according to the Dissolution Test Method.

17. A method for making a pouch according to claim 1, wherein the method comprises the steps of:
  a. providing a water-soluble apertured film wall material; and
  b. forming a single compartment pouch defining an internal volume from the water-soluble apertured film wall material.

18. The method according to claim 17 wherein the method further comprises a step of adding the one or more active agents to the internal volume.

19. A method for making a pouch according to claim 1, wherein the method comprises the steps of:
  a. providing a film wall material;
  b. creating a plurality of holes in the film wall material to form a water-soluble apertured film wall material; and
  c. forming a single compartment pouch defining an internal volume from the water-soluble apertured film wall material.

* * * * *